United States Patent
Tanaka

(10) Patent No.: US 7,478,195 B2
(45) Date of Patent: Jan. 13, 2009

(54) DISK DEVICE WITH DEGREE OF MULTIPLEXING BASED ON A RECEIVED LOGICAL BLOCK ADDRESS

(75) Inventor: Takeshi Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 429 days.

(21) Appl. No.: 11/411,323

(22) Filed: Apr. 26, 2006

(65) Prior Publication Data

US 2007/0226534 A1    Sep. 27, 2007

(30) Foreign Application Priority Data

Jan. 18, 2006    (JP)    ............... 2006-010476

(51) Int. Cl.
*G06F 11/00* (2006.01)
*G06F 3/06* (2006.01)

(52) U.S. Cl. ...................................... 711/112
(58) Field of Classification Search ........................ None
See application file for complete search history.

(56) References Cited

U.S. PATENT DOCUMENTS 5,511,177 A * 4/1996 Kagimasa et al. ........... 711/114

FOREIGN PATENT DOCUMENTS

| JP | 6-195899 | 7/1994 |
| JP | 2000-099279 | 4/2000 |
| JP | 2002-150697 | 5/2002 |
| JP | 2005-108040 | 4/2005 |

* cited by examiner

*Primary Examiner*—Kevin Verbrugge
(74) *Attorney, Agent, or Firm*—Greer, Burns & Crain, Ltd.

(57) ABSTRACT

A degree-of-multiplexing calculating unit receives a capacity restriction command including information for specifying a recording capacity used to write data on a disk from a host computer and calculates degree of multiplexing of the data based on the recording capacity. A writing unit writes data received from the host computer with the degree of multiplexing calculated by the degree-of-multiplexing calculating unit on the disk.

15 Claims, 7 Drawing Sheets

FIG.3A

| REGISTER | BIT | | | | | | | |
|---|---|---|---|---|---|---|---|---|
| | 7 | 6 | 5 | 4 | 3 | 2 | 1 | 0 |
| FEATURE | - | | | | | | | |
| NUMBER OF SECTORS | - | | | | | | | |
| LOW LBA | LBA ADDRESS (07-00) | | | | | | | |
| MEDIUM LBA | LBA ADDRESS (15-08) | | | | | | | |
| HIGH LBA | LBA ADDRESS (23-16) | | | | | | | |
| DEVICE | - | LBA | - | DEV | LBA ADDRESS (27-24) | | | |
| COMMAND | XXh : CAPACITY RESTRICTION COMMAND FOR MULTIPLEXING | | | | | | | |

FIG.3B

| REGISTER | BIT | | | | | | | |
|---|---|---|---|---|---|---|---|---|
| | 7 | 6 | 5 | 4 | 3 | 2 | 1 | 0 |
| ERROR | 00h (NORMAL) /04h(ERROR) | | | | | | | |
| NUMBER OF SECTORS | - | | | | | | | |
| LOW LBA | LBA ADDRESS (07-00) | | | | | | | |
| MEDIUM LBA | LBA ADDRESS (15-08) | | | | | | | |
| HIGH LBA | LBA ADDRESS (23-16) | | | | | | | |
| DEVICE | - | LBA | - | DEV | LBA ADDRESS (27-24) | | | |
| STATUS | 50h (NORMAL) /51h (ERROR) | | | | | | | |

FIG.4

| DEGREE OF MULTIPLEXING | LBA STARTING TO SPECIFY HOST COMPUTER | SIZE | LOCATION OF RECORDING DATA | | |
|---|---|---|---|---|---|
| 3 | A | S_A | A0 | A1 | A2 |
| SIZE OF HIGHLY MULTIPLEXED REGION | B | S_B | B0 | B1 | B2 |
| 10 | ⋮ | | | | |

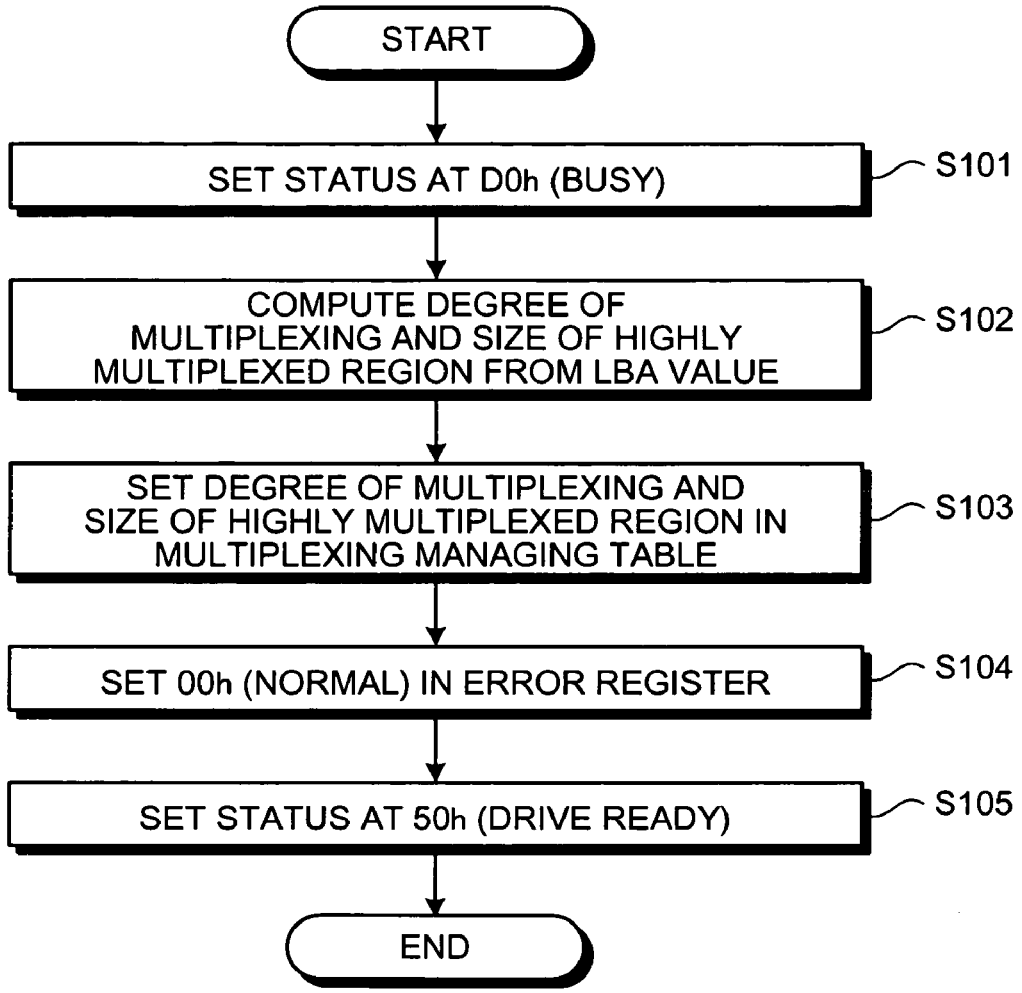

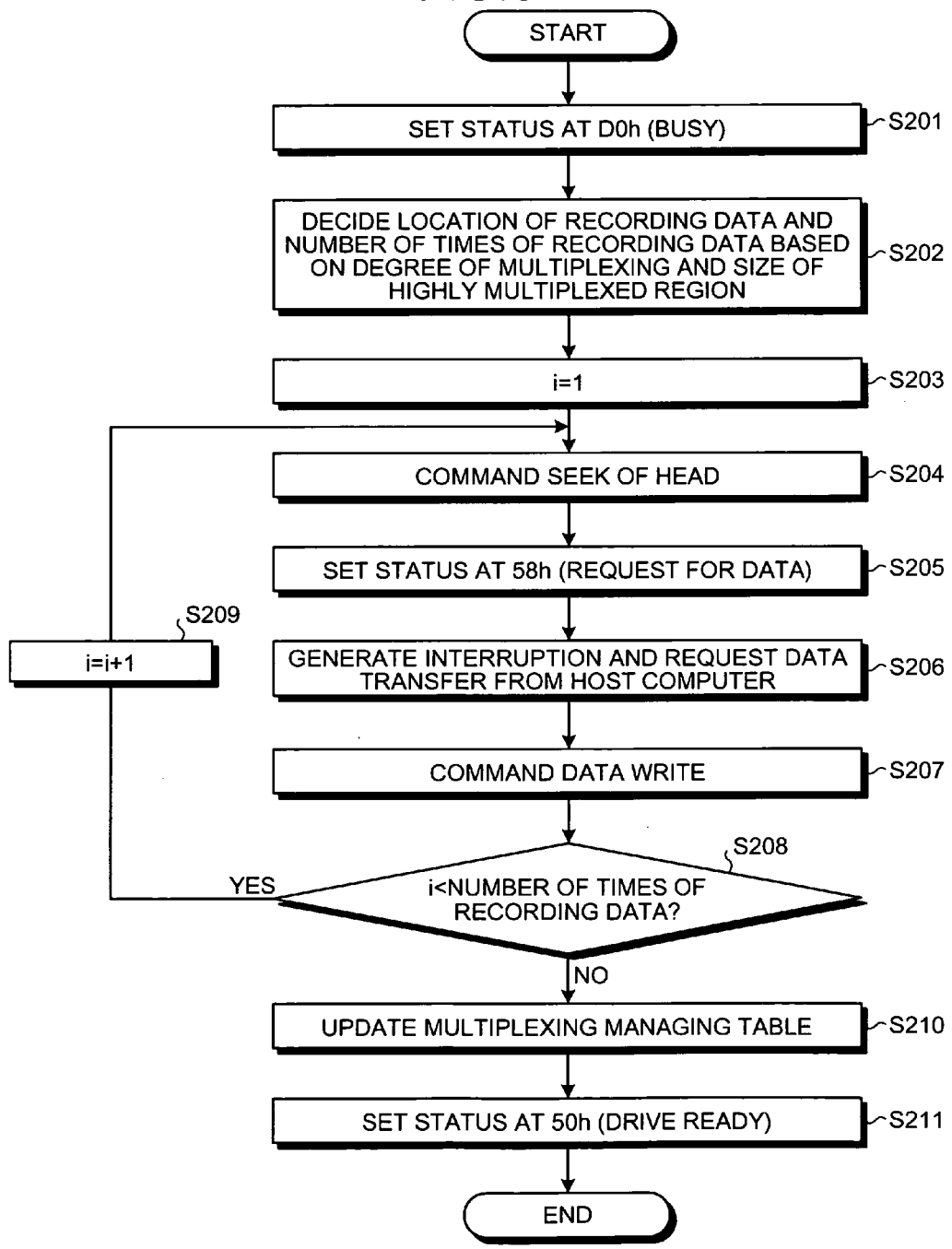

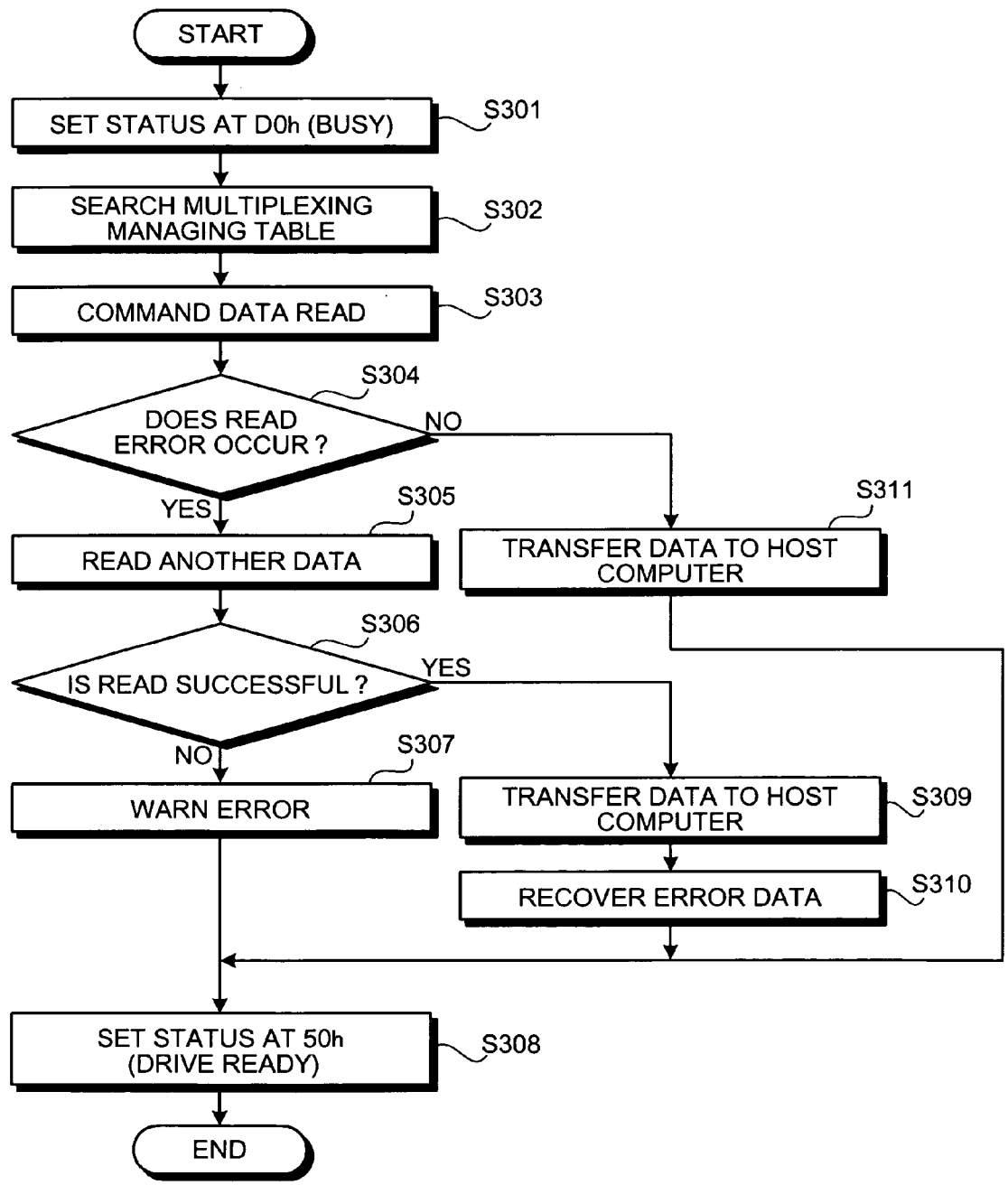

DISK DEVICE WITH DEGREE OF MULTIPLEXING BASED ON A RECEIVED LOGICAL BLOCK ADDRESS

BACKGROUND OF THE INVENTION

1. Field of the Invention

The present invention relates to a technology for multiplexing and writing data based on a command from a host computer.

2. Description of the Related Art

Recently, magnetic disk devices have been used in various fields as interfaced with a host computer (upper controller) such as a digital AV device and a mobile device as well as a personal computer. As application fields of the magnetic disk devices expand, the demand for the magnetic disk devices varies.

When the magnetic disk device is used with the mobile device, for example, high reliability is more significant than large capacity because the magnetic disk device must operate in a wide variety of environments. Therefore, a magnetic disk device has been developed, which duplicates data requiring high reliability and records the data (see, for example, Japanese Patent Application Laid-open No. 2005-108040).

However, in the conventional technology, when a proportion of highly reliable data is high, it is necessary to specify duplication every time the data is recorded, which causes a troublesome problem. In particular, when the magnetic disk device has much larger capacity compared to the volume of data to be recorded, specifying duplication is more troublesome.

Also, when only a part of data is duplicated, recording capacity may change depending on a proportion of the duplicated data. Therefore, it is not possible to identify capacity of recordable data. There is another demand for recording more multiplexed data in mobile environment and the like.

SUMMARY OF THE INVENTION

It is an object of the present invention to at least solve the problems in the conventional technology.

A disk device according to one aspect of the present invention includes a degree-of-multiplexing calculating unit that receives a capacity restriction command including information for specifying a recording capacity used to write data on a disk from a host computer and calculates degree of multiplexing of the data based on the recording capacity; and a writing unit that writes data received from the host computer with the degree of multiplexing calculated by the degree-of-multiplexing calculating unit on the disk.

A method of controlling data-write on a disk, according to another aspect of the present invention, includes receiving a capacity restriction command including information for specifying a recording capacity used to write data on a disk from a host computer; calculating degree of multiplexing of the data based on the recording capacity; and writing data received from the host computer with the degree of multiplexing calculated at the calculating on the disk.

A command control method according to still another aspect of the present invention includes issuing a write command to a disk device, the write command causing the disk device to write data on a disk; issuing a capacity restriction command to the disk device, the capacity restriction command including information for specifying a recording capacity for writing the data; and causing the disk device to write the data in a multiplexing manner according to degree of multiplexing determined based on the recording capacity.

A computer-readable recording medium according to still another aspect of the present invention stores a computer program for issuing a predetermined command to a disk device. The computer program causes a computer to execute issuing a write command to the disk device, the write command causing the disk device to write data on a disk; issuing a capacity restriction command to the disk device, the capacity restriction command including information for specifying a recording capacity for writing the data; and causing the disk device to write the data in a multiplexing manner according to degree of multiplexing determined based on the recording capacity.

A control circuit according to still another aspect of the present invention includes a degree-of-multiplexing calculating unit that receives a capacity restriction command including information for specifying a recording capacity used to write data on a disk from a host computer and calculates degree of multiplexing of the data based on the recording capacity; and a writing unit that writes data received from the host computer with the degree of multiplexing calculated by the degree-of-multiplexing calculating unit on the disk.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3A is a schematic for illustrating a format of a capacity restriction command;

FIG. 3B is a schematic for illustrating values stored in a command register when the capacity restriction command is received;

FIG. 4 is an example of a multiplexing managing table;

FIG. 5 is a flowchart of a processing procedure performed by a capacity-restriction processing unit;

FIG. 6 is a flowchart of a processing procedure performed by a write processing unit; and FIG. 7 is a flowchart of a processing procedure performed by a read processing unit.

DETAILED DESCRIPTION OF THE PREFERRED EMBODIMENTS

Exemplary embodiments of the present invention are explained in detail below with reference to the accompanying drawings.

Figure 1:
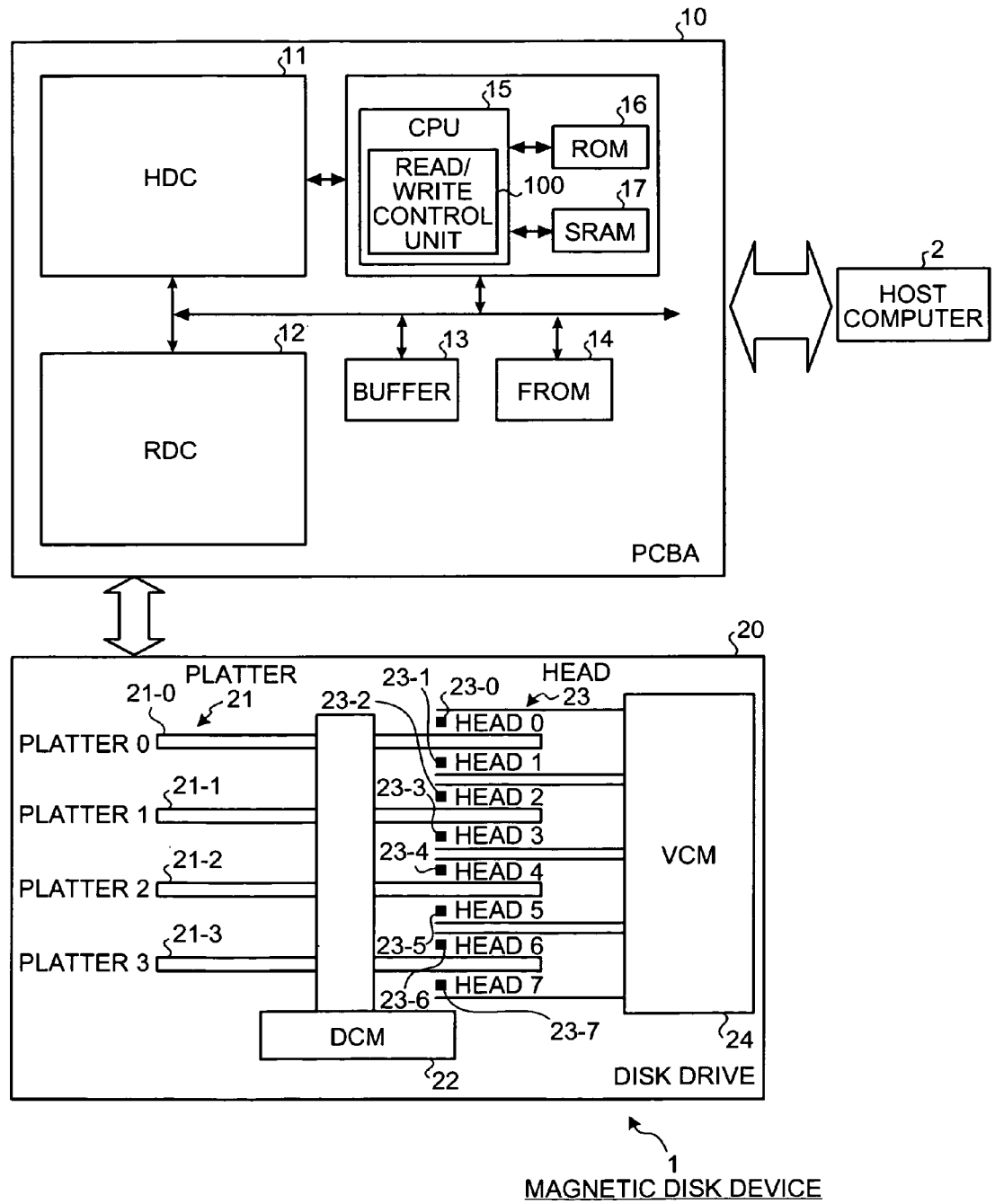
FIG. 1 is a schematic for illustrating a magnetic disk device according to an embodiment of the present invention.

FIG. 1 is a schematic for illustrating a magnetic disk device 1 according to an embodiment of the present invention. The magnetic disk device 1 includes a printed circuit board assembly (PCBA) 10 and a disk drive 20. The magnetic disk device 1 is connected to a host computer 2 via an ATA interface. Data, control command, and the like are transmitted between the magnetic disk device 1 and the host computer 2.

The PCBA 10 is a printed circuit board disposed with various LSIs that control the magnetic disk device 1. The PCBA 10 includes a hard disk controller (HDC) 11, a read channel (RDC) 12, a buffer 13, an FROM 14, a ROM 16, and an SRAM 17, mutually connected via a bus.

The HDC 11 controls an operation of writing data stored in the buffer 13 on the disk drive 20 and an operation of reading the data recorded in the disk drive 20 and storing the same in the buffer 13. The RDC 12 is an LSI that mediates between the buffer 13 and the disk drive 20 to modulate or demodulate data.

The buffer 13 is a cache that temporarily stores the data read or written between the host computer 2 and the disk drive 20. The FROM 14 is a nonvolatile memory that stores firmware that controls the operation of the magnetic disk device 1.

A CPU 15 reads and executes the firmware developed in the SRAM 17, a part of which firmware is executed within the CPU 15 as a read/write control unit 100. The read/write control unit 100 commands and controls data write and data read to the HDC 11 based on the command from the host computer 2.

The ROM 16 is a nonvolatile memory that stores each constant number required for operating the magnetic disk device 1. The SRAM 17 is a volatile memory used to develop the firmware stored in the FROM 14. The SRAM 17 also stores such information as a location of recording data that records the multiplexed data as a multiplexing managing table 171 (see FIG. 4).

The disk drive 20 is a part of the magnetic disk device 1 where the data is recorded, and has four platters 21 (platters 21-0 to 21-3), a DCM 22, eight heads 23 (heads 23-0 to 23-7), and a VCM 24.

The platter 21 is a hollow discoid substrate having magnetic recording surfaces on both top and bottom sides. The DCM 22 is a driving unit that rotates a plurality of layered platters 21. The head 23 is a magnetic head that magnetically reads/writes on the magnetic recording surfaces of the platter 21. The VCM 24 is a driving unit that shifts the head 23 in the radial direction of the disk to the intended location of data read/write.

Figure 2:
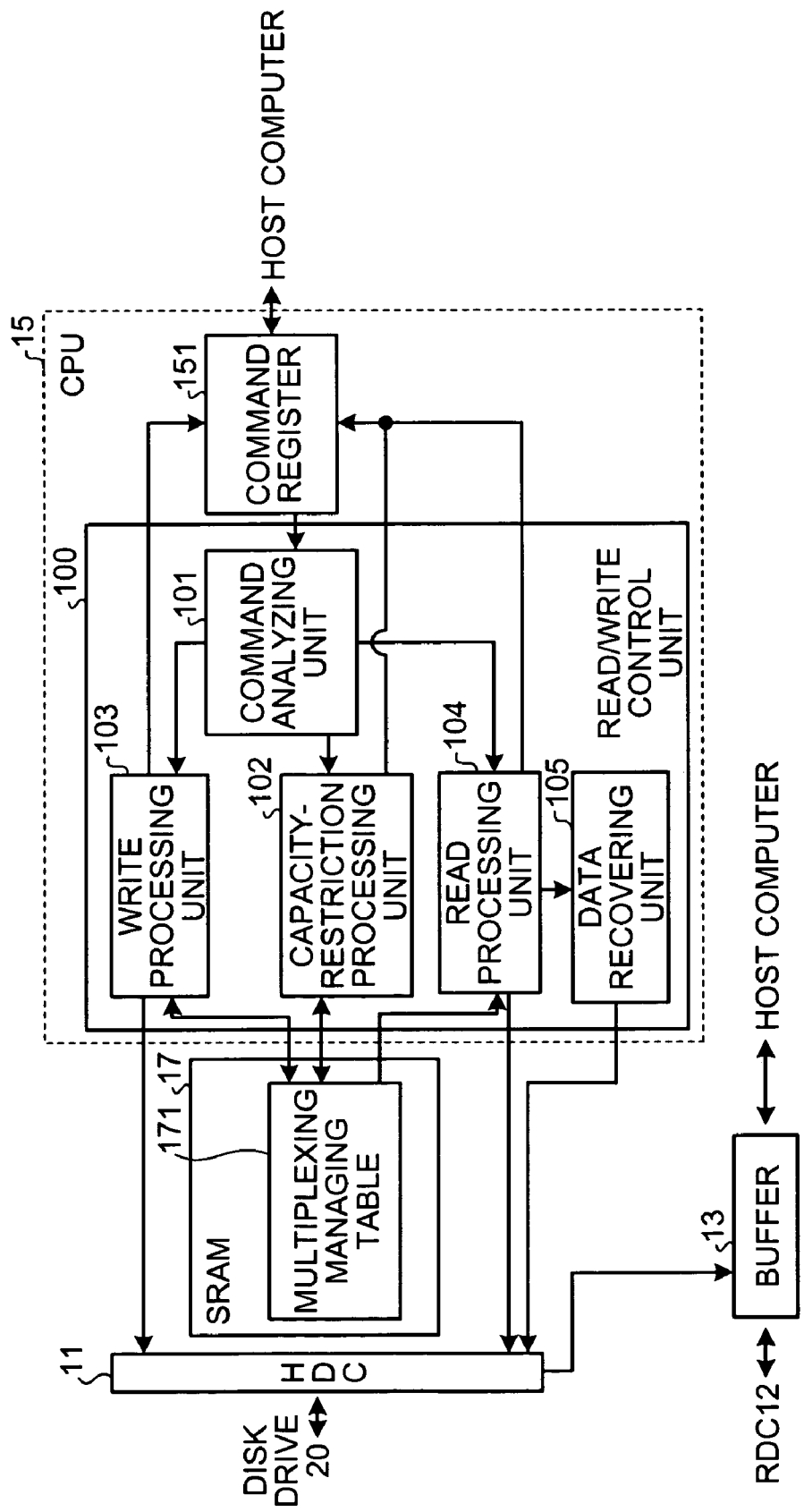
FIG. 2 is a block diagram of a read/write control unit.

FIG. 2 is a block diagram of a read/write control unit 100. The read/write control unit 100 communicates with the host computer 2 using a command register 151.

The command register 151 stores control commands that is issued to the magnetic disk device 1 by the host computer 2. The read/write control unit 100 reads a control command stored in the command register 151 to execute process corresponding to the control command.

One of the control commands stored in the command register 151 is a capacity restriction command that restricts available capacity of the magnetic disk device 1 and specifies the degree of multiplexing of the recorded data. The capacity restriction command is added as a protocol to an interface program of the host computer 2 to achieve the present invention.

FIG. 3A is a schematic for illustrating a format of the capacity restriction command. The capacity restriction command specifies a logical block address (LBA) using a part of "low LBA", "medium LBA", "high LBA", and "device" among the command register 151 and specifies the capacity restriction command as a "command".

The LBA of the capacity restriction command specifies the restricted capacity and the degree of multiplexing for the magnetic disk device 1. For example, when the magnetic disk device 1 has 100 gigabytes of capacity and an address equivalent to ¼ of 100 gigabytes is specified as the LBA of the capacity restriction command, the capacity of the magnetic disk device is restricted to 25 gigabytes and all the data are quadruplicated to be recorded. The capacity restriction command is issued by the host computer 2 according to user environment when system data such as an OS is installed.

Also, upon receipt of a control command such as the capacity restriction command, the read/write control unit 100 returns a value corresponding to a current status to the command register 151. FIG. 3B is a schematic for illustrating values stored in a command register when the capacity restriction command is received. Each value shown in the figure corresponds to the format of the capacity restriction command shown in FIG. 3A, where the top row is used as "error" instead of "feature" and the bottom row is used as "status" instead of "command".

"Error" indicated in the top row of the figure sets whether the read/write control unit 100 can normally recognize the capacity restriction command or not. "00h" is set if the capacity restriction command is normally recognized, or "04h" is set if the capacity restriction command is not normally recognized and an error occurs.

Also, "status" indicated in the bottom row of the figure sets "50h (drive ready)" or "51h (error)" as the status returned by the read/write control unit 100.

The read/write control unit 100 includes a command analyzing unit 101, a capacity-restriction processing unit 102, a write processing unit 103, a read processing unit 104, and a data recovering unit 105.

The command analyzing unit 101 analyzes a type of the control command stored in the command register 151 and sorts the control command into the capacity-restriction processing unit 102 if the control command is the capacity restriction command, into the write processing unit if it is the write command, and into the read processing unit 104 if it is the read command. The command analyzing unit 101 judges the type of the control command by referring to the value of the control command in the command register 151.

The capacity-restriction processing unit 102 processes the capacity restriction command issued by the host computer 2. Specifically, the capacity-restriction processing unit 102 computes a quotient of capacity of the magnetic disk device 1 divided by a value of the LBA stored in the command register 151 to be stored in the multiplexing managing table 171 as a degree of multiplexing. The capacity-restriction processing unit 102 stores a value obtained by subtracting a product of the degree of multiplexing and the LBA from the capacity of the magnetic disk device 1 as a size of a highly multiplexed region in the multiplexing managing table 171.

FIG. 4 is an example of the multiplexing managing table 171. The multiplexing managing table 171 includes the degree of multiplexing, the size of the highly multiplexed region, the LBA starting to specify a host computer, a size of the data, and a location of recording data where all the data written in a multiplexing manner are recorded.

For example, when the magnetic disk device 1 has 100 gigabytes of capacity and the value of the LBA is 25 gigabytes, the degree of multiplexing is 100/25=4 and the size of the highly multiplexed region is 100−4×25=0. Also, when the first 10 gigabytes of the magnetic disk device 1 having 100 gigabytes of capacity is used as an OS region and it is desired to improve reliability of the first 10 gigabytes data, setting the value of the LBA as 90 gigabytes makes the degree of multiplexing a quotient of 100/90=1 and the size of the highly multiplexed region 100−90=10 so that the first 10 gigabytes, namely the OS region, can be duplicated.

In the example shown in FIG. 4, the data indicating "A" as the LBA starting to specify a host computer has the size of "S_A", is triplicated by head-multiplexing, and indicates that each location of recording the triplicated data is "A0", "A1", and "A2", respectively. In the location of recording the data, an address to start recording data is specified in a CHS format.

The capacity-restriction processing unit 102 decides the degree of multiplexing and the size of the highly multiplexed region based on the capacity restriction command and stores the same in the multiplexing managing table 171. Therefore, it is possible to read and write data based on the degree of multiplexing.

The write processing unit 103 instructs the HDC 11 to write data on the disk drive 20. The write processing unit 103, upon receipt of a write command from the command analyzing unit 101, decides the locations of recording data by the number of the degree of multiplexing recorded by the multiplexing managing table 171 and stores the same in the multiplexing managing table 171. The write processing unit 103 instructs the HDC 11 to write the data stored in the buffer 13 on the decided locations of recording data.

When the host computer 2 specifies that data be written within the size of the highly multiplexed region of the multiplexing managing table 171 from the first LBA, the write processing unit 103 decides the locations of recording data by the number equivalent to a sum of one and the degree of multiplexing stored in the multiplexing managing table 171 and stores the same in the multiplexing managing table 171. The write processing unit 103 instructs the HDC 11 to write the data stored in the buffer 13 on the decided locations of recording data.

By the fact that the write processing unit 103 decides the locations of recording data by the number of the degree of multiplexing stored in the multiplexing managing table 171 and instructs the HDC 11 to write the data stored in the buffer 13 on the decided locations of recording data, it is possible to record the data constantly with the degree of multiplexing as specified by the capacity restriction command.

The read processing unit 104 instructs the HDC 11 to read the data from the disk drive 20. Specifically, upon receipt of a read command from the command analyzing unit 101, the read processing unit 104 instructs the HDC 11 to read data from one of the locations of recorded data stored in the multiplexing managing table 171 and to store the same in the buffer 13.

When an error occurs while reading the data, the read processing unit 104 instructs the HDC 11 to read data from another location of recorded data. When the data is successfully read from any of the location of recording data in which the data was multiplexed and recorded, the read processing unit 104 instructs the data recovering unit 105 to recover the error data.

The data recovering unit 105 recovers the error data in cooperation with the HDC 11 based on readable data among the multiplexed data according to instructions of the read processing unit 104 when an error occurs while reading a multiplexed and recorded data.

FIG. 5 is a flowchart of a processing procedure performed by the capacity-restriction processing unit 102. The capacity-restriction processing unit 102 is booted for the first time when system data such as an OS is installed.

The capacity-restriction processing unit 102 sets the status at "D0h (busy)" (step S101) and computes degree of multiplexing and a size of a highly multiplexed region from a value of a LBA stored in the command register 151 (step S102).

The quotient of the capacity of the magnetic disk device 1 divided by the value of the LBA stored in the command register 151 is obtained as the degree of multiplexing. A value obtained by subtracting a product of the degree of multiplexing and the value of the LBA from the capacity of the magnetic disk device 1 is assumed as the size of the highly multiplexed region.

The degree of multiplexing and the size of the highly multiplexed region are then set in the multiplexing managing table 171 (step S103), and "00h (normal)" is set in an error register (step S104). The status is then set at "50h (drive ready)" (step S105).

In this way, the capacity-restriction processing unit 102 computes the degree of multiplexing and the size of the highly multiplexed region to set the same in the multiplexing managing table 171 at first when system data such as an OS is installed, whereby the write processing unit 103 can automatically execute multiplexed write based on the multiplexing managing table 171.

FIG. 6 is a flowchart of a processing procedure performed by the write processing unit 103. The write processing unit 103 sets the status at "D0h (busy)" (step S201), and then decides the number of recording data and the location of recording data based on the degree of multiplexing and the size of the highly multiplexed region (step S202).

When the location of the written data is not within the size of the highly multiplexed region from the top based on the LBA and the data size specified by the write command, the locations of the recorded data by the degree of multiplexing are decided. When the location of the written data is within the size of the highly multiplexed region from the top based on the LBA and the data size specified by the write command, the locations of the recorded data by the number equivalent to the sum of one and the degree of multiplexing are decided.

The write processing unit 103 then sets an initial value 1 as a variable i that counts the number of repetition (step S203) and selects one location of recording data to instruct seek for the head 23 to the HDC 11 (step S204). Upon completion of preparation for receiving the data, the write processing unit 103 sets the status at "58h (request for data)", instructs the HDC 11 to generate interrupt in the host computer 2, and requests data transfer from the host computer 2 (step S206).

When the host computer 2 transfers the data to the buffer 13, the write processing unit 103 instructs the HDC 11 to write the data on a medium (step S207). When the data write completes normally, the write processing unit 103 decides whether i is smaller than the number of times of recording data (step S208. If i is smaller than the number of times of recording data, the write processing unit 103 adds one to i (step S209) and returns to step S204.

On the other hand, if i is not smaller than the number of times of recording data, the write processing unit 103 updates the multiplexing managing table 171 based on the LBA and the decided location of written data (step S210), and sets the status at "50h (drive ready)" (step S211).

As described above, the write processing unit 103 writes the data based on the degree of multiplexing and the size of the highly multiplexed region of the multiplexing managing table 171 in a multiplexing manner, whereby reliability of the magnetic disk device 1 can be improved.

It is supposed herein to set the status at "50h (drive ready)" upon completion of writing the number of times of recording data. However, the status may be set at "50h (drive ready)" upon writing the data on the medium one time to notify the host computer 2 of completion of the write processing earlier.

FIG. 7 is a flowchart of a processing procedure performed by the read processing unit 104. The read processing unit 104 sets the status at "D0h (busy)" at first (step S301), searches the multiplexing managing table 171 using the LBA specified by the read command, and obtains a location of storing data (step S302).

The read processing unit 104 then instructs the HDC 11 to execute data read (step S303), and judges whether a read error occurred (step S304). As a result, when the read error occurred, the read processing unit 104 reads other multiplexed data (step S305), and judges whether reading any of the other multiplexed data succeeded (step S306).

When reading all of the other multiplexed data failed, the read processing unit 104 notifies the host computer 2 of the error (step S307), and then sets the status at "50h (drive ready)" (step S308).

On the other hand, when reading any of the other multiplexed data succeeded, the read processing unit 104 sets the status at "58h (request for data)", instructs the HDC 11 to generate interrupt in the host computer 2, and transfers the data to the host computer 2 (step S309). The read processing unit 104 then instructs the data recovering unit 105 to recover the error data (step S310) and sets the status at "50h (drive ready)" (step S311).

Also, when the read error does not occur, the read processing unit 104 sets the status at "58h (request for data)", commands the HDC 11 to generate interrupt in the host computer 2, and transfers the data to the host computer 2 (step S311). The read processing unit 104 then sets the status at "50h (drive ready)" (step S308).

As described above, if an error occurs in reading data from the medium, the read processing unit 104 reads other data written in a multiplexing manner and transfers the same to the host computer 2, whereby it is possible to improve reliability of the magnetic disk device 1.

As explained above, according to an embodiment of the present invention, the capacity-restriction processing unit 102 computes the degree of multiplexing and the size of the highly multiplexed region based on the capacity restriction command received from the host computer 2 and sets the same in the multiplexing managing table 171. The write processing unit 103 writes the data in a multiplexing manner based on the multiplexing managing table 171. The read processing unit 104 reads other data written in a multiplexing manner and transfers the same to the host computer 2 if a read error occurs. Therefore, it is possible to improve reliability of the magnetic disk device 1 only by a simple operation of issuing the capacity restriction command to the magnetic disk device 1 at the beginning of writing system data such as an OS.

While the magnetic disk device was explained in the present embodiment, the present invention is not limited to this but may be applied in the same manner to other disk devices like an optical disk device.

According to an embodiment of the present invention, multiple recording is executed only by specifying a recording capacity used for data write. Therefore, it is possible to multiplex and record the data with only a simple operation to advantageously improve reliability.

Furthermore, according to an embodiment of the present invention, multiple recording is executed only by specifying a last logic block address to be used. Therefore, it is possible to multiplex and record the data with only a simple operation to advantageously improve reliability.

Moreover, according to an embodiment of the present invention, the degree of multiplexing is increased for only a part of the data. Therefore, it is possible to advantageously increase the degree of multiplexing only for the data that requires especially high reliability.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A disk device comprising:
 a degree-of-multiplexing calculating unit that receives a capacity restriction command including information for specifying a recording capacity used to write data on a disk from a host computer and calculates degree of multiplexing of the data based on the recording capacity; and
 a writing unit that writes data received from the host computer with the degree of multiplexing calculated by the degree-of-multiplexing calculating unit on the disk.

2. The disk device according to claim 1, wherein
 the degree-of-multiplexing calculating unit receives a last logic block address from the host computer and calculates the degree of multiplexing based on the received last logic block address and a capacity of the disk device.

3. The disk device according to claim 2, wherein
 the degree-of-multiplexing calculating unit takes a quotient of the capacity of the disk device divided by the last logic block address as the degree of multiplexing, and increases the degree of multiplexing by one for data with a size obtained by subtracting a product of the last logic block address and the degree of multiplexing from the capacity of the disk device.

4. The disk device according to claim 1, further comprising:
 a reading unit that reads, if an error occurs when one data is read from the recording medium from among multiplexed data, other data from among the multiplexed data.

5. The disk device according to claim 4, further comprising:
 a recovery unit that recovers the one data using correctly-read data.

6. A method of controlling data-write on a disk, the method comprising:
 receiving a capacity restriction command including information for specifying a recording capacity used to write data on a disk from a host computer;
 calculating degree of multiplexing of the data based on the recording capacity; and
 writing data received from the host computer with the degree of multiplexing calculated on the disk.

7. The method according to claim 6, wherein
 the receiving includes receiving a last logic block address from the host computer, and
 the calculating includes calculating the degree of multiplexing based on the received last logic block address and a capacity of the disk device.

8. The method according to claim 7, wherein
 the calculating includes
  taking a quotient of the capacity of the disk device divided by the last logic block address as the degree of multiplexing; and
  increasing the degree of multiplexing by one for data with a size obtained by subtracting a product of the last logic block address and the degree of multiplexing from the capacity of the disk device.

9. A command control method comprising:
 issuing a write command to a disk device, the write command causing the disk device to write data on a disk;
 issuing a capacity restriction command to the disk device, the capacity restriction command including information for specifying a recording capacity for writing the data; and
 causing the disk device to write the data in a multiplexing manner according to degree of multiplexing determined based on the recording capacity.

10. A computer-readable recording medium that stores a computer program for issuing a predetermined command to a disk device, wherein the computer program causes a computer to execute:

issuing a write command to the disk device, the write command causing the disk device to write data on a disk;

issuing a capacity restriction command to the disk device, the capacity restriction command including information for specifying a recording capacity for writing the data; and causing the disk device to write the data in a multiplexing manner according to degree of multiplexing determined based on the recording capacity.

11. A control circuit comprising:

a degree-of-multiplexing calculating unit that receives a capacity restriction command including information for specifying a recording capacity used to write data on a disk from a host computer and calculates degree of multiplexing of the data based on the recording capacity; and a writing unit that writes data received from the host computer with the degree of multiplexing calculated by the degree-of-multiplexing calculating unit on the disk.

12. The control circuit according to claim 11, wherein the degree-of-multiplexing calculating unit receives a last logic block address from the host computer and calculates the degree of multiplexing based on the received last logic block address and a capacity of the disk device.

13. The control circuit according to claim 12, wherein the degree-of-multiplexing calculating unit takes a quotient of the capacity of the disk device divided by the last logic block address as the degree of multiplexing, and increases the degree of multiplexing by one for data with a size obtained by subtracting a product of the last logic block address and the degree of multiplexing from the capacity of the disk device.

14. The control circuit according to claim 11, further comprising:

a reading unit that reads, if an error occurs when one data is read from the recording medium from among multiplexed data, other data from among the multiplexed data.

15. The control circuit according to claim 14, further comprising:

a recovery unit that recovers the one data using correctly-read data.

* * * * *